Oct. 18, 1955  J. P. RITTER, JR  2,721,088
TOW LINE RELEASING DEVICES
Filed Feb. 12, 1954
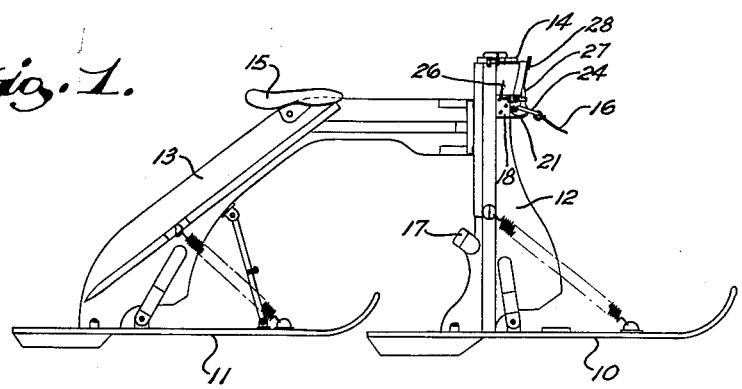
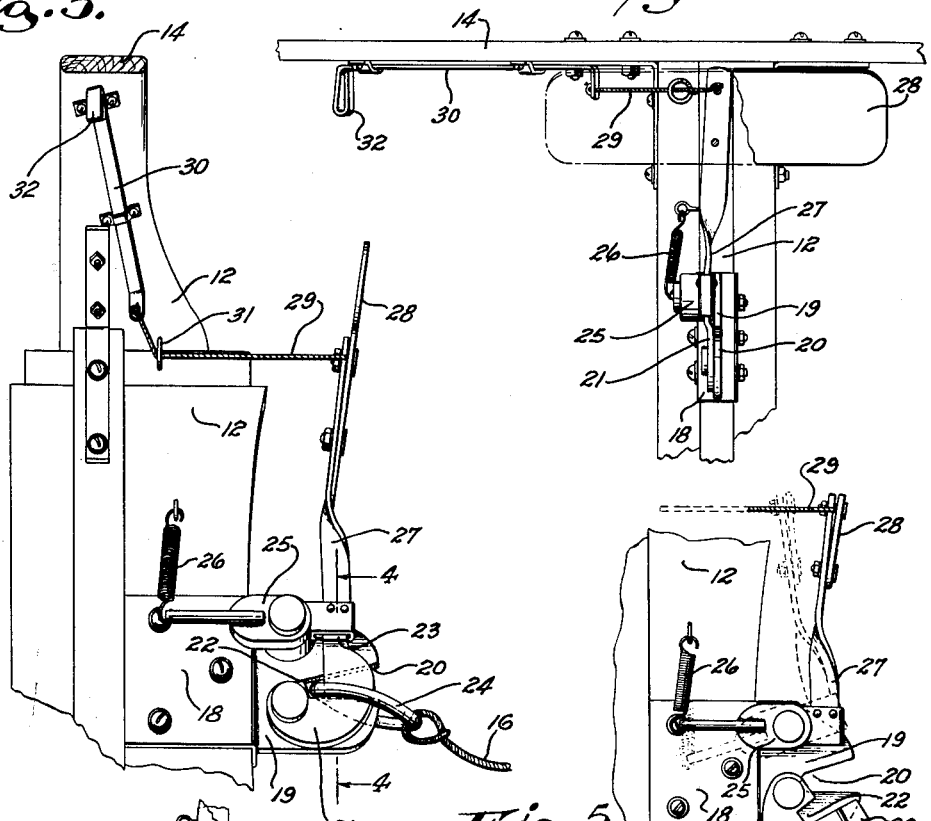
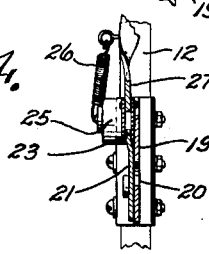
INVENTOR.
Julius P. Ritter Jr.,
BY Morsell & Morsell
Attys.

United States Patent Office 2,721,088
Patented Oct. 18, 1955

2,721,088

TOW LINE RELEASING DEVICES

Julius P. Ritter, Jr., Racine, Wis.

Application February 12, 1954, Serial No. 409,827

6 Claims. (Cl. 280—480)

This invention relates to improvements in tow line releasing devices, and more particularly to a tow line releasing device operatively mounted on a portion of a rider carrying towed vehicle.

There are in use for sports and amusement purposes certain types of rider carrying vehicles or devices adapted to be towed, through a connecting tow line rope or cable, by a motor propelled towing vehicle. In most instances a certain amount of skill on the part of the rider of the towed vehicle is required to maintain the equilibrium of the towed vehicle and if control of the towed vehicle is lost or if it commences to tilt or overturn, it is highly desirable that the tow line be immediately disengaged from the towed vehicle so that the rider will not be injured by the continued movement of the overturned towed vehicle.

With the foregoing in mind it is the primary object of the present invention to provide on a towed vehicle a readily releasable tow line connection.

A further object of the invention is to provide, on a towed vehicle, a tow line connection which may be manually operated to release the tow line or which is automatically operated through overturn or tilting of the towed vehicle.

A further object of the invention is to provide, on a towed vehicle, a tow line release which is automatically operated by the force thereagainst of the medium on which the towed vehicle is operating should the towed vehicle overturn.

A further object of the invention is to provide a tow line releasing device with which a towed vehicle may be readily equipped, which is positive in its action, which is neat and attractive in appearance, and which is well adapted for the purposes described.

With the above and other objects in view the invention consists of the improved tow line releasing device and its parts and combinations as set forth in the claims, and all equivalents thereof.

In the accompanying drawing in which the same reference characters indicate the same parts in all of the views:

Fig. 1 is a side view of a vehicle in the form of a water ski-bob equipped with the improved tow line releasing device;

Fig. 2 is an enlarged fragmentary front view of a water ski-bob equipped with the tow line releasing device;

Fig. 3 is a tilted side view, somewhat in perspective, of the forward post portion of a water ski-bob equipped with the improved tow line releasing device, the handle bar structure being shown in section;

Fig. 4 is a fragmentary detail sectional view taken on line 4—4 of Fig. 3; and

Fig. 5 is a fragmentary detail view of a portion of the post of a water ski-bob showing the tow line releasing device mounted thereon and in tow line releasing condition.

While the improved tow line releasing device is herein illustrated in association with a particular form of water vehicle in the nature of a motor-boat towed water ski-bob, this is merely by way of illustration and the improved tow line releasing device may be incorporated in any type of cable towed vehicle or apparatus such as a boat, sled, toboggan, etc.

The water ski-bob illustrated in Fig. 1 of the drawing is the subject matter of the copending J. P. Ritter, Jr. and Thomas A. Ritter application, Serial No. 386,899, filed October 19, 1953, and will not be described in detail. Suffice it to say that said towable water ski-bob comprises a pair of longitudinally alined ski members 10 and 11 adapted to underlie and support an articulated frame which comprises a forward upright post 12 and a rear supporting element 13 having a rearwardly downwardly inclined portion and an integral upper forwardly extending portion. The forward end of the latter is movably attached by vertical pivot means to the forward upright post 12. Rigidly mounted on and extending transversely of the upper end of the forward upright post 12 is a handle bar 14 while a saddle 15 is mounted on an upper rear portion of the rear supporting element 13. The longitudinally alined ski elements 10 and 11 are so mounted relative to their respective frame members that they may tilt or oscillate in vertical planes.

In the use of the improved ski-bob or vehicle it is intended that it be positioned a suitable distance rearwardly of a motor driven towing vehicle or boat and is attached to the rear of the latter by an elongated flexible tow rope or cable 16. The rear end portion of the tow rope or cable 16 should be affixed to a portion of the forward upright post 12 of the ski-bob or towed vehicle. The rider or operator of the towed vehicle or ski-bob should be seated on the saddle 15 with his feet resting on a transverse foot support 17 on a lower portion of the front post 12. The hands of the rider engage opposite end portions of the handle bar 14 and by turning the handle bar the rider is able to swing the upright post 12 and forward ski 10 laterally to direct or steer the towed vehicle as desired. The skis 10 and 11 are free to oscillate vertically over the wake of the towing boat or over snow or inundations if the towed vehicle is a land vehicle.

It is, of course, always possible that sudden movements, turns, or bumps may cause the towed vehicle to tilt or suddenly overturn and this would normally present a serious danger to the rider because he would be thrown into the water or onto the ground and might become bumped by or entangled with the moving towed vehicle.

The present invention seeks to eliminate this particular hazard, however, by providing means, both manually operated and automatically operated, whereby the tow rope or cable 16 may be quickly released from the towed vehicle or ski-bob at the will of the operator or automatically, should the towed vehicle overturn and a pressure plate portion thereof be subjected to pressure or force from the ground or water.

In the present exemplification a metallic plate having a bifurcated portion 18 embraces an upper forwardly projecting fin portion of the forward post 12 of the ski-bob or vehicle and is rigidly secured thereto. Integral with the bifurcated portion 18 of the plate and projecting forwardly therefrom is a flange 19 formed with a forwardly opening inwardly reduced ring receiving slot 20. Pivotally mounted on the flange 19 is a gravity actuated, weighted latching lug 21 shaped as is best shown in Figs. 3 and 5 and having an intermediate shouldered slot 22 therein complementary to the slot 20 in the flange 19, and an extension finger 23 at its free end, which finger is of reduced width and is offset laterally slightly from the plane of the major portion of the lug 21. In its cable releasing position the latching lug 21 is caused by its weight and mounting to oscillate by gravity to the dropped position of Fig. 5 wherein the slot 20 in the flange 19 is opened. However, when the latching lug 21 is in the upturned operative position of Fig. 3, in which position it is releasably maintained by means later to be described, the slotted portion 22 of the latching lug cooperates with the inner end of the slot 20 in the flange 19 to form a guarded opening of sufficient size to movably receive a metallic ring 24 or the like anchored to the rear end of the tow cable 16. The projecting finger portion 23 of the lug 21, in the position of Fig. 3, extends across the opening to the slot 20 and blocks it, thereby preventing undesired withdrawal of the cable-carried ring 24 from the slot 20.

In order to releasably maintain the latching lug 21 in its operative slot closing position of Fig. 3, a lever 25 is intermediately pivotally mounted on the flange 19 and the forward portion of said lever is transversely slotted or apertured to receive and engage the finger end portion 23 of the latching lug 21. Said lever is normally maintained in its operative finger engaging position of Fig. 3 by a coiled spring 26 which is anchored between the rear end of the lever 25 and a portion of the post structure 12.

The forward end portion of the lever 25 which rocks in a plane parallel to the axis of the post 12 has rigidly secured thereto the lower end of a supporting arm 27 which rigidly carries at its upper end a transverse pressure plate 28 arranged to project equally on both sides of the axis of the post 12. One end portion of a flexible operating connection 29 is secured to the intermediate portion of the pressure plate 28. The other end portion of the operating connection 29 is anchored to the inner angled extremity of an operating trigger 30 reciprocatably mounted on the underside of a portion of the handle bar structure 14, an intermediate portion of the operating connection 29 being passed through an anchored guide ring 31. Should the handle bar structure be tubular the operating connection 29 could be passed therethrough and secured to one end of a movably mounted operating trigger.

From the foregoing description it will be evident that the rider of the vehicle, seated on the saddle 15 and grasping the handle bar structure 14 may manually operate the tow line releasing device should he find it desirable to quickly disengage the towed vehicle from the tow line. When this releasing action is premeditated the operator merely engages the flanged outer end portion 32 of the trigger so as to reciprocate it toward the left relative to Fig. 2 and through this movement of the trigger a pull is imposed on the operating connection 29 which causes the pressure plate 28 and its supporting arm 27 to pivotally move in a counterclockwise direction relative to Fig. 3 thereby raising the apertured end of the lever 25 from the fingered end portion 23 of the latching lug. Gravity and the pull exerted on the tow line-carried ring 24 will then cause the latching lug 21 to drop to the releasing or inoperative position of Fig. 5, thereby opening the slot 20 in the flange 19 permitting withdrawal of the ring-equipped end of the tow line 16, thereby freeing the towed vehicle or ski-bob from the tow line.

There are, of course, times when a sudden upsetting of the towed vehicle occurs without the operator having an opportunity of manually manipulating the trigger to release the tow line, or the rider may be thrown from the towed vehicle and might be in danger of being struck and dragged by the vehicle. To guard against this contingency the pressure plate 28 will automatically operate the tow line release upon a capsizing of the vehicle to an extent where the material of the surface being travelled over such as water, snow or ground would forcefully strike the pressure plate 28 to cause a rearward rocking of the arm 27, a disengagement of the locking lug 21, and release of the ring end of the tow line. Inasmuch as the pressure plate 28 extends equally on both sides of the vertical axis of the towed vehicle regardless of the side toward which the towed vehicle capsizes there will be engagement of the pressure plate with the water or material of the surface on which the towed vehicle is travelling.

Any releasing movement imparted to the latching lug 21 through oscillation of the lever 25 is against the tension of the coiled spring 26 so that normally the lever 25 is maintained in the latching lug engaging position of Fig. 3.

The improved tow line releasing device is susceptible of easy incorporation in a towed vehicle or apparatus of the character described and is susceptible of premeditated manual operation, or automatic operation upon the capsizing of the towed vehicle. In either case release of the tow line between the towed vehicle and the towing instrumentality is effected. Consequently, in the event of an upset or loss of control of the towed vehicle, its propulsion by the towing vehicle can be quickly terminated to avoid danger which might result from the continued rapid towing of the upset towed vehicle. The device is simple, inexpensive, and well adapted for the purposes set forth.

What is claimed as the invention is:

1. The combination with a rider-carrying vehicle towable over a surface and susceptible of capsizing, and a tow line having a looped attaching end, of a latch operatively mounted on the front portion of the vehicle and normally engaging the attaching end of the tow line, and means projecting from said latch equi-distant on both sides of the longitudinal median of the vehicle and movable while being towed to operate said latch and release the tow line upon the imposition thereagainst of pressure from the material of the surface on which said vehicle is towed upon capsize of said vehicle toward either side.

2. The combination with the front portion of a towable vehicle and a tow line therefor having a ring-like end portion, of a latch operatively mounted on the front portion of the vehicle and normally holding the ring-like end portion of the tow line, and a plate mounted on the front central portion of the vehicle and projecting equi-distant on both sides of the longitudinal median of the vehicle and movable while being towed by longitudinal pressure thereagainst for operating said latch to tow line releasing position.

3. The combination with a rider-carrying vehicle towable over a surface and susceptible of capsizing, and a tow line having a looped attaching end, of a hook plate mounted on the front portion of the vehicle and normally engaging the attaching end of the tow line, a weighted lug movably associated with the hook plate and cooperating therewith in its raised position to lock the attaching end of the tow line on the hook plate, spring urged lever means normally engaging the lug to maintain it in its raised locking position, and a pressure actuated plate projecting equi-distant on both sides of the longitudinal median of the vehicle and under the control of the rider of the vehicle or actuated by a capsizing of the vehicle toward either side for moving said lever while the vehicle is being towed to lug disengaging position to permit gravitation of the lug to unlocking position relative to the hook plate for automatic release of the tow line.

4. The combination with a rider-carrying vehicle towable over a surface and susceptible of capsizing, and a tow line having a looped attaching end, of a hook plate mounted on the front portion of the vehicle and normally engaging the attaching end of the tow line, a weighted lug movably associated with the hook plate and cooperating therewith in its raised position to lock the attaching end of the tow line on the hook plate, yieldable lever means releasably engageable with the lug to maintain it in its raised position, manually operated means on the vehicle and connected with the lever for moving the latter to lug disengaging position, while the vehicle is being towed to permit gravitation of the lug to hook plate unlocking position, and other means also connected to the lever and responsive to pressure thereagainst from an external source on either side of the longitudinal median of the vehicle for automatically moving said lever to lug disengaging position upon capsizing of the vehicle toward either side while being towed.

5. In a tiltable towed vehicle having a front upright post, latch mechanism adjacent said post for releasably engaging an end portion of a tow line, and a pressure plate operatively associated with the latch mechanism to control movement of the latter to tow line releasing position, said pressure plate projecting laterally of both sides of the axis of the vehicle post for contact with and actuation by pressure thereagainst from the medium of the surface being travelled over by said vehicle upon capsizing of the vehicle to either side.

6. In a tiltable towed vehicle having a front upright post, latch mechanism adjacent said post for releasably engaging an end portion of a tow line, a pressure plate operatively associated with the latch mechanism to control movement of the latter to tow line releasing position, said pressure plate projecting laterally of both sides of the axis of the vehicle post for contact with and actuation by pressure thereagainst from the medium of the surface being travelled over by said vehicle upon capsizing of the vehicle to either side, and other means extending to said pressure plate for manual actuation of the latter by the vehicle rider at a point remote from said pressure plate.

References Cited in the file of this patent

UNITED STATES PATENTS

| | | |
|---|---|---|
| 391,526 | Foran | Oct. 23, 1888 |
| 1,115,807 | Gellrich | Nov. 3, 1914 |
| 1,401,774 | Halpern | Dec. 27, 1921 |
| 1,736,156 | Harter | Nov. 19, 1929 |
| 2,432,548 | Taylor | Dec. 16, 1947 |
| 2,470,294 | Eberman | May 17, 1949 |
| 2,663,278 | Skinner | Dec. 22, 1953 |